United States Patent
Li et al.

(10) Patent No.: US 10,721,143 B2
(45) Date of Patent: Jul. 21, 2020

(54) TESTING METHOD, DEVICE AND SYSTEM

(71) Applicant: Siemens Aktiengesellschaft, Munich (DE)

(72) Inventors: Rui Li, Beijing (CN); Shuo Wan, Beijing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 220 days.

(21) Appl. No.: 15/709,552

(22) Filed: Sep. 20, 2017

(65) Prior Publication Data

US 2018/0234309 A1 Aug. 16, 2018

(30) Foreign Application Priority Data

Feb. 15, 2017 (CN) .......................... 2017 1 0081974

(51) Int. Cl.
*H04L 12/26* (2006.01)
*H04L 29/06* (2006.01)

(52) U.S. Cl.
CPC ............ *H04L 43/028* (2013.01); *H04L 43/08* (2013.01); *H04L 43/087* (2013.01); *H04L 43/0894* (2013.01); *H04L 43/50* (2013.01); *H04L 69/22* (2013.01)

(58) Field of Classification Search
CPC ..... H04L 43/028; H04L 43/087; H04L 43/50; H04L 43/08; H04L 69/22
See application file for complete search history.

(56) References Cited

U.S. PATENT DOCUMENTS 5,680,585 A 10/1997 Bruell
2003/0172177 A1 9/2003 Kersley
(Continued)

FOREIGN PATENT DOCUMENTS

CN 102739457 A 10/2012
CN 102780588 A 11/2012
(Continued)

OTHER PUBLICATIONS

Shaohua Yu Wuhan Research Ins of Posts and Telecoms China: "Updated draft ITU-T Reconmendation Y.dpifr ä Framework for Deep Packet Inspectionä;TD 836 (NGN-GSI)", ITU-T Draft ; Study Period 2009-2012, International Telecommunication Union, Geneva ; CH, vol. 17/13, pp. 1-54, XP017568014,; 2012.
(Continued)

*Primary Examiner* — Redentor Pasia
(74) *Attorney, Agent, or Firm* — Harness, Dickey & Pierce, P.L.C.

(57) ABSTRACT

An embodiment of the present invention relates to the technical field of networks, in particular to a testing method, device and system for testing the performance of a Deep Packet Inspection (DPI) device. In this method, a performance analyzing device respectively acquires packet transmission characteristics of packets when being directly forwarded and packet transmission characteristics of the packets having been processed by the DPI device; and a test result on the performance of the DPI device with larger reference significance is acquired by comparing the two packet transmission characteristics.

12 Claims, 4 Drawing Sheets

(56) References Cited

U.S. PATENT DOCUMENTS

| | | | |
|---|---|---|---|
| 2009/0077228 A1* | 3/2009 | Weil | H04L 63/1416 709/224 |
| 2011/0280143 A1* | 11/2011 | Li | H04L 12/14 370/252 |
| 2012/0069749 A1* | 3/2012 | Famolari | G06Q 30/02 370/252 |
| 2012/0191826 A1* | 7/2012 | Gotesdyner | H04L 12/6418 709/221 |
| 2013/0128742 A1* | 5/2013 | Yu | H04L 63/0245 370/235 |
| 2014/0201374 A1 | 7/2014 | Ashwood-Smith et al. | |
| 2014/0233479 A1* | 8/2014 | Dahod | H04W 76/27 370/329 |
| 2016/0344637 A1* | 11/2016 | Saha | H04L 47/10 |
| 2017/0111854 A1* | 4/2017 | Ho | H04B 7/14 |
| 2017/0201537 A1* | 7/2017 | Caldwell | H04J 3/0667 |
| 2017/0310573 A1* | 10/2017 | Cook | H04L 43/50 |
| 2017/0374597 A1* | 12/2017 | Ray | H04W 24/02 |
| 2018/0103408 A1* | 4/2018 | Amini | H04W 28/04 |

FOREIGN PATENT DOCUMENTS

| | | |
|---|---|---|
| CN | 103178996 A | 6/2013 |
| CN | 103259699 A | 8/2013 |
| WO | WO 9735406 A1 | 9/1997 |

OTHER PUBLICATIONS

C.-S. Yang et al: "Design and evaluation of deep packet inspection system: a case study", I ET Networks, vol. 1, No. I, pp. 2-9, XP055444634, Michael Faraday House, Six Hills Way, Stevenage, Herts. SGI 2AY, UK ISSN: 2047-4954, DOI: 10.1049/iet-net.2011.0048; 2012.
Extended European Search Report dated Feb. 7, 2018.
DPI Test Solution :Sprrent Communications; 2011.
Chinese Office Action dated Jun. 6, 2017.
European Office Action dated May 17, 2019.

* cited by examiner

TESTING METHOD, DEVICE AND SYSTEM

PRIORITY STATEMENT

The present application hereby claims priority under 35 U.S.C. § 119 to Chinese patent application number CN 201710081974.0 filed Feb. 15, 2017, the entire contents of which are hereby incorporated herein by reference.

FIELD

At least one embodiment of the present invention generally relates to the technical field of networks, and in particular to a testing method, device and system.

BACKGROUND

Deep packet inspection (DPI), also referred to as "complete packet inspection and information extraction", is a computer network packet analysis and inspection technique, and a device using the DPI technique ("DPI" device for short) may inspect a data portion (data) of a packet, and optionally may also inspect a header portion (header) of the packet, to acquire packet relevant information.

This acquired packet relevant information may be further used to perform deep packet analysis or network behavior analysis, such as: for determining whether there exists a situation of protocol nonuniformity, virus, junk mail, etc., and whether the packet involves network intrusion, etc.

SUMMARY

The inventors have recognized that the performance of a DPI device may influence the accuracy of DPI detection and data transmission performance, etc. The inventors have recognized that how to test the performance of a DPI device, becomes a problem to be solved.

In view of this, at least one embodiment of the present invention provides a testing method, device and system for testing the performance of a DPI device.

In a first embodiment, a packet generating method is provided. The method can be executed by a packet generating device. In this method, the packet generating device acquires a fourth group of packets belonging to the first protocol, and analyzes packet structural features of a protocol data unit (PDU) of the fourth group of packets and value features of data blocks of the same length in the same position in the PDU of each packet; and generates a group of first protocol packets belonging to the first protocol, wherein the generated group of first protocol packets has the packet structural features and data in the group of first protocol packets has the value features.

In a second embodiment, a testing method is provided, and the method can be used for testing the performance of a deep packet inspection (DPI) device. In this method, in one embodiment, a packet forwarding device outputs a second group of packets after forwarding a received first group of packets, wherein the packet forwarding device performs no DPI detection on the first group of packets. A performance analyzing device receives the second group of packets from the packet forwarding device, and counts packet transmission characteristics of the second group of packets.

In another embodiment, a DPI device outputs a third group of packets after processing the same received first group of packets, and the performance analyzing device receives the third group of packets from the DPI device, and counts packet transmission characteristics of the third group of packets. The performance analyzing device compares the packet transmission characteristics of the second group of packets with the packet transmission characteristics of the third group of packets to obtain a first performance of the DPI device, wherein the performance analyzing device respectively acquires packet transmission characteristics of packets when being directly forwarded and packet transmission characteristics of the packets having been processed by the DPI device. By comparing the two packet transmission characteristics, considering that the influences on the packet transmission characteristics after DPI devices with different performance process the packets are different, and taking the packet transmission characteristics of packets output after the packets are directly forwarded as a reference, a test result which can reflect the DPI device performance more truly can be acquired.

In a third embodiment, a packet generating device is provided, comprising: a packet acquiring module, configured to acquire a fourth group of packets belonging to the first protocol; and a packet generating module, configured to: analyze packet structural features of a protocol data unit (PDU) of the fourth group of packets and value features of data blocks of the same length in the same position in the PDU of each packet, and generate a group of first protocol packets belonging to the first protocol, wherein the generated group of first protocol packets has the packet structural features and data in the group of first protocol packets has the value features.

In a fourth embodiment, a packet generating device is provided, comprising: at least one memory, configured to store machine-readable instructions; and at least one processor, configured to call the machine-readable instructions to execute a packet generating method provided by the first embodiment, or any possible implementation of the first embodiment.

In a fifth embodiment, a performance analyzing device is provided, comprising: a packet acquiring module, configured to receive a second group of packets from a packet forwarding device, the second group of packets being output after the packet forwarding device forwards a first group of packets, and the packet forwarding device performing no DPI detection on the first group of packets; a performance counting module, configured to count packet transmission characteristics of the second group of packets; the packet acquiring module being further configured to receive a third group of packets from the DPI device, the third group of packets being output after the DPI device processes the first group of packets; the performance counting module being further configured to count packet transmission characteristics of the third group of packets; and the performance counting module being further configured to compare the packet transmission characteristics of the second group of packets with the packet transmission characteristics of the third group of packets to obtain a first performance of the DPI device, wherein the performance analyzing device respectively acquires packet transmission characteristics of packets when being directly forwarded and packet transmission characteristics of the packets having been processed by the DPI device. By comparing the two packet transmission characteristics, considering that the influences on the packet transmission characteristics after DPI devices with different performance process the packets are different, and taking the packet transmission characteristics of packets output after the packets are directly forwarded as a reference, a test result which can reflect the DPI device performance more truly can be acquired.

In a sixth embodiment, a performance analyzing device is provided, comprising: at least one memory, configured to store machine-readable instructions; and at least one processor, configured to call the machine-readable instructions to execute a method provided by the second embodiment, or any possible implementation of the second embodiment.

In a seventh embodiment, a testing system is provided, and the system is used for testing the performance of a deep packet inspection (DPI) device. The system may comprise a packet generating device and a performance analyzing device involved in any of the foregoing embodiments, wherein the packet generating device is configured to generate a first group of packets, and send the generated first group of packets to a packet forwarding device and the DPI device respectively; the performance analyzing device is configured to respectively acquire a second group of packets which is output after the packet forwarding device forwards the first group of packets, and a third group of packets which is output after the DPI device processes the first group of packets; count packet transmission characteristics of the second group of packets and the packet transmission characteristics of the third group of packets; and comparing the packet transmission characteristics of the second group of packets with the packet transmission characteristics of the third group of packets to obtain a first performance of the DPI device, wherein the performance analyzing device respectively acquires packet transmission characteristics of packets when being directly forwarded and packet transmission characteristics of the packets having been processed by the DPI device. By comparing the two packet transmission characteristics, considering that the influences on the packet transmission characteristics after DPI devices with different performance process the packets are different, and taking the packet transmission characteristics of packets output after the packets are directly forwarded as a reference, a test result which can reflect the DPI device performance more truly can be acquired.

In an eighth embodiment, a machine-readable medium is provided, wherein the machine-readable medium stores machine-readable instructions thereon that when executed by a processor cause the processor to execute a method provided by the first embodiment, the second embodiment, any possible implementation of the first embodiment or any possible implementation of the second embodiment.

In a ninth embodiment, a machine-readable instruction is provided that when executed by a processor cause the processor to execute a method provided by the first embodiment, the second embodiment, any possible implementation of the first embodiment or any possible implementation of the second embodiment.

LIST OF REFERENCE NUMERALS

Figure 1A:
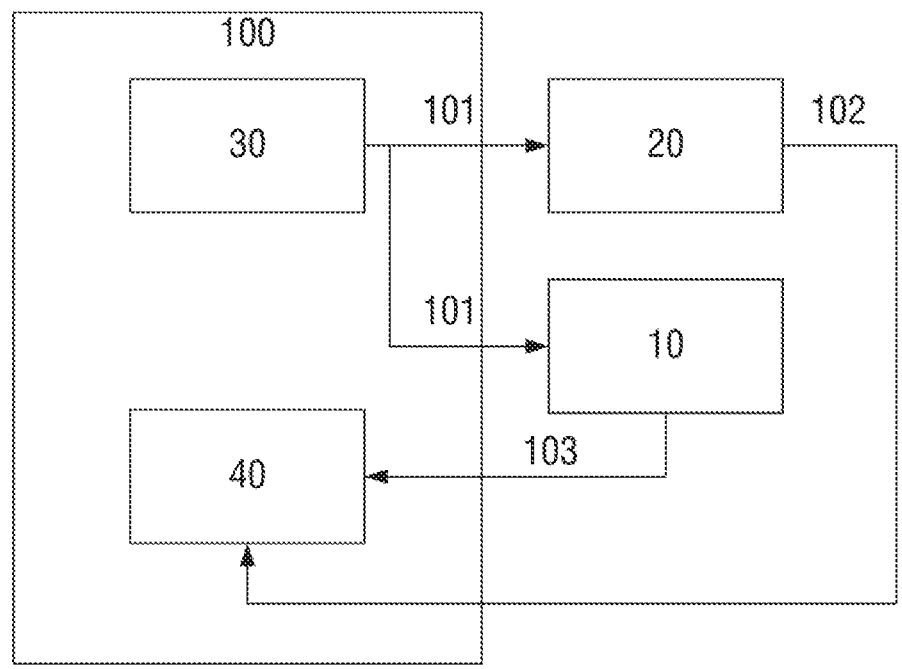
FIGS. 1A and 1B show a connection relation with other devices when a testing system provided by an embodiment of the present invention is testing the performance of a DPI device.

100: Testing system
10: DPI device
20: Packet forwarding device
30: Packet generating device
40: Performance analyzing device
201: Forwarding, performing no DPI detection
202: Performing DPI detection
101: First group of packets
102: Second group of packets
103: Third group of packets
104: Fourth group of packets
105: Fifth group of packets
106 Packet structural features
107: Value features
108: Second position relation features
109: First position relation features
110: Protocol parameters
1011: A group of first protocol packets
S201: Acquiring a fourth group of packets 104 belonging to a first protocol
S202: Analyzing the packet structural features 106 and the data value features 107, and a first position relation feature 109 among packets of different message types
S203: Generating a group of first protocol packets 1011 of the first protocol conforming to the features
S204: Acquiring a fifth group of packets 105
S205: Determining a second position relation feature 108 among packets of different protocols
S206: Generating packets belonging to other protocols
S207: Placing packets of different protocols according to the position relation features 108 to generate a first group of packets 101
S208: Sending the first group of packets 101 to a packet forwarding device 20
S209: Sending the first group of packets 101 to a DPI device 10
S210: Outputting a second group of packets 102 after forwarding the first group of packets 101
S211: Outputting a third group of packets 103 after processing the first group of packets 101
S212: Counting packet transmission characteristics of the second group of packets 102
S213: Counting packet transmission characteristics of the third group of packets 103
S214: Comparing the packet transmission characteristics of the second group of packets 102 with the packet transmission characteristics of the third group of packets 103 to obtain a first performance of the DPI device 10
S215: Counting the number of packets included in the third group of packets 103

S216: Determining a second performance of the DPI device 10 according to the number of packets included in the third group of packets 103 and the number of packets included in the first group of packets 101
S301: Base line testing
S302: Single protocol testing
S303: Base line testing
S304: Hybrid protocol testing
A: Result of single protocol testing
B: Result of hybrid protocol testing
S401: Acquiring a fourth group of packets 104 belonging to a first protocol
S402: Analyzing packet structural features 106, data value features 107 and a first position relation feature 109
S403: Generating a group of first protocol packets 1011 belonging to the first protocol
S404: Acquiring a fifth group of packets 105
S405: Determining a second position relation feature 108
S406: Generating packets belonging to other protocols
S407: Generating a first group of packets 101 according to the second position relation feature 108
301: Packet acquiring module
302: Packet generating module
303: Memory
304: Processor
401: Packet acquiring module
402: Performance counting module
403: Memory
404: Processor

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or porcessors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In a first embodiment, a packet generating method is provided. The method can be executed by a packet generating device. In this method, the packet generating device acquires a fourth group of packets belonging to the first protocol, and analyzes packet structural features of a protocol data unit (PDU) of the fourth group of packets and value features of data blocks of the same length in the same position in the PDU of each packet; and generates a group of first protocol packets belonging to the first protocol, wherein the generated group of first protocol packets has the packet structural features and data in the group of first protocol packets has the value features.

Since packet structural features of a packet and value features of a data block can be effectively extracted, a generated testing packet can be closer to an acquired packet to construct a testing packet closer to a real network environment, so as to ensure that a performance test result of a DPI device is more accurate.

Optionally, after acquiring the fourth group of packets belonging to the first protocol, the packet generating device further analyzes a first position relation feature among the packets containing messages of different message types in the fourth group of packets, and when generating the group of first protocol packets, further generates the group of first protocol packets according to the first position relation feature.

In this way, not only PDU structural and value features inside a packet are taken into consideration, position features among packets of different message types are further taken into consideration, so that a position relation among the packets in the generated fourth group of packets are closer to a real network environment, which further ensures the accuracy of a performance test result of a DPI device.

One possible situation of at least one embodiment is as follows: the packets in the first group of packets respectively belong to different protocols. In this situation, optionally, the packet generating device further acquires a fifth group of packets, wherein the fifth group of packets comprises packets belonging to the first protocol and packets belonging to other protocols. The packet generating device determines a second position relation feature between the packets belonging to the first protocol and the packets belonging to other protocols in the fifth group of packets, and generates the packets belonging to the other protocols. Furthermore, after generating the group of first protocol packets and the packets belonging to the other protocols, according to the second position relation feature, the packet generating device places the group of first protocol packets and the generated packets belonging to the other protocols to generate the first group of packets.

With regard to a circumstance where a group of packets to be generated respectively belong to different protocols, the packet generating device further acquires position relation features among packets of different protocols, and considers the position relation features when the packets are generated, so that the position relation among the packets of different protocols in the generated group of packets are closer to a real network environment, which further ensures the accuracy of a performance test result of a DPI device.

Optionally, before generating a first group of packets, the packet generating device sets protocol parameters of the first group of packets. The packet generating device generates the first group of packets according to the protocol parameters.

In this way, the protocol parameters can be flexibly configured according to testing requirements, so that testing is more targeted.

In a second embodiment, a testing method is provided, and the method can be used for testing the performance of a deep packet inspection (DPI) device. In this method, in one embodiment, a packet forwarding device outputs a second group of packets after forwarding a received first group of packets, wherein the packet forwarding device performs no DPI detection on the first group of packets. A performance analyzing device receives the second group of packets from the packet forwarding device, and counts packet transmission characteristics of the second group of packets.

In another embodiment, a DPI device outputs a third group of packets after processing the same received first group of packets, and the performance analyzing device receives the third group of packets from the DPI device, and counts packet transmission characteristics of the third group of packets. The performance analyzing device compares the packet transmission characteristics of the second group of packets with the packet transmission characteristics of the third group of packets to obtain a first performance of the DPI device, wherein the performance analyzing device respectively acquires packet transmission characteristics of packets when being directly forwarded and packet transmission characteristics of the packets having been processed by the DPI device. By comparing the two packet transmission characteristics, considering that the influences on the packet transmission characteristics after DPI devices with different performance process the packets are different, and taking the packet transmission characteristics of packets output after the packets are directly forwarded as a reference, a test result which can reflect the DPI device performance more truly can be acquired.

Optionally, the packet forwarding device may further compare a first group of packets and the third group of packets after receiving the third group of packets, so as to determine a second performance of the DPI device. For example, the number of packets included in the third group of packets can be counted, and the second performance of the DPI device are determined according to the number of packets included in the third group of packets and the number of packets included in the first group of packets. Alternatively, the second performance of the DPI device can be further determined by comparing the first group of packets and the third group of packets to determine the integrity of the third group of packets and the correctness of the packet contents, and whether the packets of the third group of packets have been disordered compared to the original first group of packets.

In this way, the performance analyzing device can obtain a more complete and detailed DPI device performance test result.

Optionally, the first group of packets received by the packet forwarding device and the DPI device is generated using the first embodiment, or any possible implementation of the first embodiment.

In this way, not only the first group of packets used in testing being closer to a packet in a real network environment is ensured, an effective performance analyzing method is used, so that the performance of the DPI device obtained through testing are more accurate.

In a third embodiment, a packet generating device is provided, comprising: a packet acquiring module, configured to acquire a fourth group of packets belonging to the first protocol; and a packet generating module, configured to: analyze packet structural features of a protocol data unit (PDU) of the fourth group of packets and value features of data blocks of the same length in the same position in the PDU of each packet, and generate a group of first protocol packets belonging to the first protocol, wherein the generated group of first protocol packets has the packet structural features and data in the group of first protocol packets has the value features.

Since packet structural features of a packet and value features of a data block can be effectively extracted, a generated testing packet can be closer to an acquired packet to construct a testing packet closer to a real network environment, so as to ensure that a performance test result of a DPI device is more accurate.

Optionally, the packet generating module is further configured to, after the packet acquiring module acquires the fourth group of packets belonging to the first protocol, analyze a first position relation feature among the packets containing messages of different message types in the fourth group of packets; and when the group of first protocol packets are generated, the packet generating module is specifically configured to: generate the group of first protocol packets according to the first position relation feature.

In this way, not only PDU structural and value features inside a packet are taken into consideration, position features among packets of different message types are further taken into consideration, so that a position relation among the packets in the generated fourth group of packets are closer to a real network environment, which further ensures the accuracy of a performance test result of a DPI device.

Optionally, the packet acquiring module is further configured to, when the packets in the first group of packets respectively belong to different protocols, acquire a fifth group of packets, wherein the fifth group of packets comprises packets belonging to the first protocol and packets belonging to other protocols; and the packet generating module is further configured to: determine a second position relation feature between the packets belonging to the first protocol and the packets belonging to other protocols in the fifth group of packets, generate the packets belonging to the other protocols, and after generating the group of first protocol packets and the packets belonging to the other protocols, according to the second position relation feature, place the group of first protocol packets and the generated packets belonging to the other protocols to generate the first group of packets.

With regard to a circumstance where a group of packets to be generated respectively belong to different protocols, the packet generating device further acquires position relation features among packets of different protocols, and considers the position relation features when the packets are generated, so that the position relation among the packets of different protocols in the generated group of packets are closer to a real network environment, which further ensures the accuracy of a performance test result of a DPI device.

Optionally, the packet generating module is further configured to: before generating the first group of packets, set protocol parameters of the first group of packets; and when the first group of packets are generated, the packet generating module is specifically configured to: generate the first group of packets according to the protocol parameters.

In this way, the protocol parameters can be flexibly configured according to testing requirements, so that testing is more targeted.

In a fourth embodiment, a packet generating device is provided, comprising: at least one memory, configured to store machine-readable instructions; and at least one processor, configured to call the machine-readable instructions to execute a packet generating method provided by the first embodiment, or any possible implementation of the first embodiment.

In a fifth embodiment, a performance analyzing device is provided, comprising: a packet acquiring module, configured to receive a second group of packets from a packet forwarding device, the second group of packets being output after the packet forwarding device forwards a first group of packets, and the packet forwarding device performing no DPI detection on the first group of packets; a performance counting module, configured to count packet transmission characteristics of the second group of packets; the packet acquiring module being further configured to receive a third group of packets from the DPI device, the third group of packets being output after the DPI device processes the first group of packets; the performance counting module being further configured to count packet transmission characteristics of the third group of packets; and the performance counting module being further configured to compare the packet transmission characteristics of the second group of packets with the packet transmission characteristics of the third group of packets to obtain a first performance of the DPI device, wherein the performance analyzing device respectively acquires packet transmission characteristics of packets when being directly forwarded and packet transmission characteristics of the packets having been processed by the DPI device. By comparing the two packet transmission characteristics, considering that the influences on the packet transmission characteristics after DPI devices with different performance process the packets are different, and taking the packet transmission characteristics of packets output after the packets are directly forwarded as a reference, a test result which can reflect the DPI device performance more truly can be acquired.

Optionally, the performance counting module is further configured to, after the packet acquiring module receives the third group of packets, compare a first group of packets and the third group of packets after receiving the third group of packets, so as to determine a second performance of the DPI device. For example, the number of packets included in the third group of packets can be counted; and the second performance of the DPI device are determined according to the number of packets included in the third group of packets and the number of packets included in the first group of packets. Alternatively, the second performance of the DPI device can be further determined by comparing the first group of packets and the third group of packets to determine the integrity of the third group of packets and the correctness of the packet contents, and whether the packets of the third group of packets have been disordered compared to the original first group of packets.

In this way, the performance analyzing device can obtain a more complete and detailed DPI device performance test result.

In a sixth embodiment, a performance analyzing device is provided, comprising: at least one memory, configured to store machine-readable instructions; and at least one processor, configured to call the machine-readable instructions to execute a method provided by the second embodiment, or any possible implementation of the second embodiment.

In a seventh embodiment, a testing system is provided, and the system is used for testing the performance of a deep packet inspection (DPI) device. The system may comprise a packet generating device and a performance analyzing device involved in any of the foregoing embodiments, wherein the packet generating device is configured to generate a first group of packets, and send the generated first group of packets to a packet forwarding device and the DPI device respectively; the performance analyzing device is configured to respectively acquire a second group of packets which is output after the packet forwarding device forwards the first group of packets, and a third group of packets which is output after the DPI device processes the first group of packets; count packet transmission characteristics of the second group of packets and the packet transmission characteristics of the third group of packets; and comparing the packet transmission characteristics of the second group of packets with the packet transmission characteristics of the third group of packets to obtain a first performance of the DPI device.

The performance analyzing device respectively acquires packet transmission characteristics of packets when being directly forwarded and packet transmission characteristics of the packets having been processed by the DPI device. By comparing the two packet transmission characteristics, considering that the influences on the packet transmission characteristics after DPI devices with different performance process the packets are different, and taking the packet transmission characteristics of packets output after the packets are directly forwarded as a reference, a test result which can reflect the DPI device performance more truly can be acquired.

In an eighth embodiment, a machine-readable medium is provided, wherein the machine-readable medium stores machine-readable instructions thereon that when executed by a processor cause the processor to execute a method provided by the first embodiment, the second embodiment, any possible implementation of the first embodiment or any possible implementation of the second embodiment.

In a ninth embodiment, a machine-readable instruction is provided that when executed by a processor cause the processor to execute a method provided by the first embodiment, the second embodiment, any possible implementation of the first embodiment or any possible implementation of the second embodiment.

In combination with any embodiment or one possible implementation of any embodiment described above, the packet transmission characteristics comprise at least one of the following characteristics: a packet transmission rate; a packet transmission delay; and a packet transmission jitter.

In combination with any embodiment or one possible implementation of any embodiment described above, the packets in the first group of packets respectively belong to different protocols, or the packets in the first group of packets belong to the same protocol, wherein the protocols involved in the embodiments of the present invention may refer to protocols in the same protocol layer, and these protocol layers may be a physical layer, a data link layer, a network layer, a transmission layer, a session layer, a presentation layer or an application layer. Taking a circumstance where packets in the first group of packets respectively belong to different protocols as an example, for example: with regard to the transmission layer, these different protocols may comprise a transmission control protocol (TCP), user datagram protocol (UDP), etc. For another example: with regard to the application layer, these different protocols may comprise a hyper text transfer protocol (HTTP), a file transfer protocol (FTP), etc.

In addition, according to different packet generating requirements, the definition on the same protocol may also be different. For example, a generated packet is configured to test the difference between performances of processing an FTP packet and an HTTP packet by a DPI device, then when generating the packet, the packet generating device may only take the differences in terms of structure and field values of the FTP and HTTP packets into consideration, but ignore different FTP protocol versions and different HTTP protocol versions. For another example, if a generated packet is configured to test the difference between performances of processing packets of different FTP protocol versions by a DPI device, when generating the packet, the packet generating device may deeply analyze the differences in terms of structure and field values of the different FTP protocol versions, and at this time, different protocols may refer to different versions of the same type of protocol.

In combination with any embodiment or one possible implementation of any embodiment described above, the packet structural features comprise at least one of the following features: having a structure of tag, length and value (TLV), having a structure of tag and value (TV); a data block having a fixed tail tag; a data block having a fixed value; the value of a data block belonging to one of a group of values; a data block having a fixed length; a data block having a boundary label; and structure nesting.

In combination with any embodiment or one possible implementation of any embodiment described above, the value features comprise at least one of the following features: the values of data blocks at the same position and having the same length in PDUs of at least two packets in the fourth group of packets are the same; the values fall within a value range but do not comprise visible characters; the values are random; the values are the same, and the length exceeds a pre-set length threshold value; at least one pre-set special character is contained; the values are in an ascending order of packets; and the values are in a descending order of packets.

As stated previously, the performance of a DPI device may influence the accuracy of DPI detection and data transmission performance, etc. The embodiments of the present invention primarily use processing in the following embodiments to enable a solution using the system of the embodiments of the present invention to effectively test the performance of a DPI device.

In one embodiment, an effective testing packet is provided.

A group of packets are acquired, packet structural features and data value features of a PDU of this group of packets are extracted, and furthermore, if the group of packets belongs to different protocols, position relation features among packets of different protocols may also be extracted from this group of packets. Then, a group of testing packets are generated according to these extracted features. Since packet features can be effectively extracted, a generated testing packet can be closer to an acquired packet to construct a testing packet closer to a real network environment, so as to ensure that a performance test result of a DPI device is more accurate.

In a second embodiment, an effective performance analyzing method is used.

Packet transmission characteristics of packets when being directly forwarded and packet transmission characteristics of the packets having been processed by the DPI device are acquired respectively, and a test result on the performance of the DPI device with larger reference significance is acquired by comparing the two packet transmission characteristics.

Furthermore, the packets before and after being processed by the DPI device may also be compared, to further analyze a test result of the DPI device performance.

The testing method, packet generating method, packet generating device and performance analyzing device, and the testing system of the present invention will be described in detail below in conjunction with the accompanying drawings.

Figure 1B:
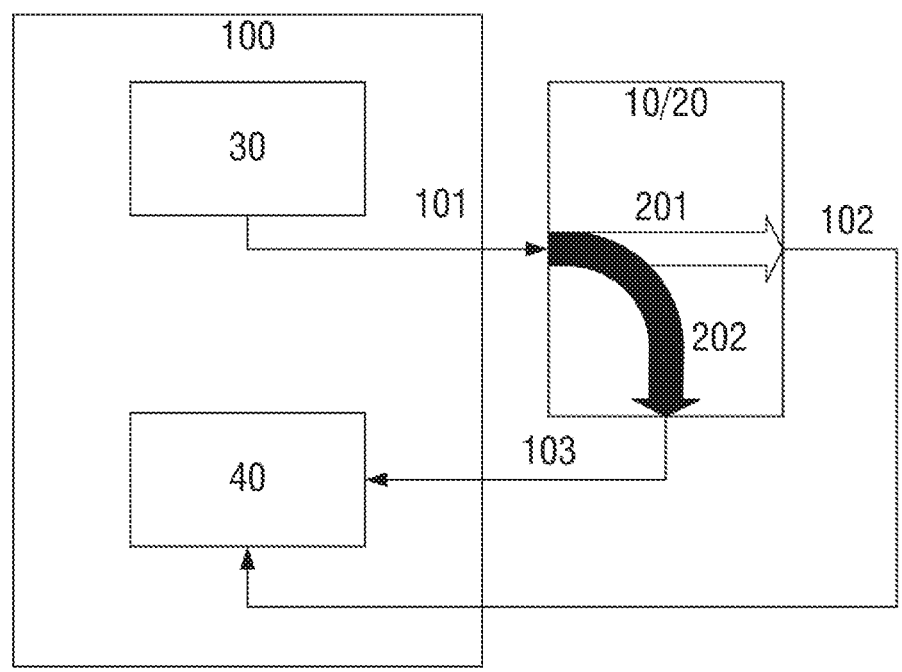

FIGS. 1A and 1B show a connection relation with other devices when a testing system 100 provided by an embodiment of the present invention is testing the performance of a DPI device.

In one embodiment, the testing system 100 generates a first group of packets 101, and respectively outputs the first group of packets 101 to a packet forwarding device 20 and a DPI device 10.

In another embodiment, the testing system 100 respectively receives a third group of packets 103 output after the DPI device 10 processes the first group of packets 101 and a second group of packets 102 output after the packet forwarding device 20 forwards the first group of packets 101, and compares packet transmission characteristics of the second group of packets 102 with the packet transmission characteristics of the third group of packets 103 to obtain a first performance of the DPI device 10. Furthermore, the number of packets included in the third group of packets 103 can also be counted; and a second performance of the DPI device 10 is determined according to the number of packets included in the third group of packets 103 and the number of packets included in the first group of packets 101.

FIG. 1A differs from FIG. 1B in that:
in FIG. 1A, the DPI device 10 and the packet forwarding device 20 are two devices which are not used, the first group of packets 101 is respectively output to the DPI device 10 and the packet forwarding device 20, and the testing system 100 respectively acquires the second group of packets 102 from the packet forwarding device 20 and acquires the third group of packets 103 from the DPI device 10.

In FIG. 1B, the DPI device 10 and the packet forwarding device 20 are the same packet processing device, and a DPI detection function of the packet processing device can be enabled and disabled by setting a switch. If the DPI detection function is enabled, the packet processing device is the DPI device 10, and if the DPI detection function is disabled, the packet processing device is the packet forwarding device 20.

With regard to the setting of the switch, two possible implementations below are described by way of example, and the practical implementations are not limited to this:

Implementation I

The switch is set manually by testing personnel.

Correspondingly, when the switch is set to disable the DPI detection function of the packet processing device, the performance analyzing device 40 receives the second group of packets 102, and when the packet transmission characteristics are counted, the packet transmission characteristics of the second group of packets 102 are counted. When the switch is set to enable the DPI detection function of the packet processing device, the performance analyzing device 40 receives the third group of packets 103, and when the packet transmission characteristics are counted, the packet transmission characteristics of the third group of packets 103 are counted.

Implementation II

The switch is set by the testing system 100.

A packet generating device 30 of the testing system 100 may send indication information to the packet processing device, the indication information being used for setting the switch.

For example, before sending the first group of packets 101 for the first time, the packet generating device 30 sends first indication information to the packet processing device, and sets the switch to disable the DPI detection function of the packet processing device. After receiving the first indication information, the packet processing device disables the DPI detection function thereof. After completing the first sending of the first group of packets 101, the packet generating device 30 sends second indication information to the packet processing device, and sets the switch to enable the DPI detection function of the packet processing device. After receiving the second indication information, the packet processing device enables the DPI detection function thereof.

Correspondingly, after sending the first indication information, before sending the first group of packets 101 for the first time, the packet generating device 30 may notify the performance analyzing device 40: the DPI detection function of the packet processing device has been disabled. The performance analyzing device 40 then is able to determine that the second group of packets 102 is subsequently received, and the packet transmission characteristics of the second group of packets 102 are counted. After completing the sending of the first group of packets 101, before sending the second group of packets 102 for the second time, the packet generating device 30 may notify the performance analyzing device 40: the DPI detection function of the packet processing device has been enabled. The performance analyzing device 40 then is able to determine that the third group of packets 103 is subsequently received, and the packet transmission characteristics of the third group of packets 103 are counted.

As shown in FIGS. 1A and 1B, the testing system 100 may comprise: a packet generating device 30 and a performance analyzing device 40, wherein the packet generating device 30 is configured to generate the first group of packets 101, and send the generated first group of packets 101 to the packet forwarding device 20 and the DPI device 10 respectively.

The performance analyzing device 40 is configured to
  acquire a second group of packets 102 after the packet forwarding device 20 forwards the first group of packets 101;
  acquire a third group of packets 103 output after the DPI device 10 processes the first group of packets 101;
  count packet transmission characteristics of the second group of packets 102;
  count packet transmission characteristics of the third group of packets 103; and
  compare the packet transmission characteristics of the second group of packets 102 with the packet transmission characteristics of the third group of packets 103 to obtain a first performance of the DPI device 10,
wherein the aforementioned packet transmission characteristics comprise at least one of the following characteristics: a packet transmission rate, a packet transmission delay, and a packet transmission jitter. By comparing the packet transmission characteristics of the second group of packets 102 and the packet transmission characteristics of the third group of packets 103, a packet processing speed when the DPI device 10 is performing DPI detection can be measured. By forwarding a group of packets with no DPI detection, taking packet transmission characteristics of output packets as a reference, performing DPI detection on the same group of packets, and comparing packet transmission characteristics of the packets output after being subjected to DPI detection with the reference packet transmission characteristics, the performance of the DPI device 10 obtained is more objective and accurate.

Optionally, the testing system 100 provided by the embodiment of the present invention can be used respectively for performance testing on at least two different DPI devices 10, and when testing, the first group of packets 101 and the same packet forwarding device 20 of the same group can be used. In this way, performance test results with regard to the at least two different DPI devices 10 are respectively obtained in the same testing environment and packet input, and can be compared with each other.

Optionally, the performance of the DPI device 10 obtained from the above comparison of packet transmission characteristics can be taken as a first performance of the DPI device 10.

Optionally, after the performance analyzing device 40 receives the third group of packets 103, the number of packets included in the third group of packets 103 can also be counted, and a second performance of the DPI device 10 is determined according to the number of packets included in the third group of packets 103 and the number of packets included in the first group of packets 101. Since the performance analyzing device 40 and the packet generating device 30 belong to the same testing system 100, the performance analyzing device 40 may be aware of the number of packets included in the first group of packets 101 generated by the packet generating device 30 in advance. Alternatively, since the packet forwarding device 20 forwards the first group of packets 101 and performs no DPI detection, there is relatively little possibility of packet loss, and the performance analyzing device 40 may also count the received second group of packets 102 as the number of packets included in the first group of packets 101.

The second performance may be used to measure the capability of the DPI device 10 to correctly recognize packets. If the DPI device 10 cannot recognize one packet when performing DPI detection on this packet, the DPI device 10 will not output the packet, i.e. causing loss of the packet. Then, the capability of the DPI device 10 to correctly recognize packets can be measured by counting the number of packets included in the third group of packets 103.

For example: the number of packets included in the first group of packets 101 is N, N being a positive integer; the number of packets included in the third group of packets 103 received by the performance analyzing device 40 is M, M being not greater than N and a positive integer, then M/N can be used to measure the capability of the DPI device 10 to correctly recognize packets. The greater M/N is, the stronger the capability of the DPI device 10 to correctly recognize packets is, and the better the second performance is; and the smaller M/N is, the weaker the capability of the DPI device 10 to correctly recognize packets is, and the poorer the second performance is.

Wherein the packets in the first group of packets 101 may respectively belong to different protocols, or the packets in the first group of packets 101 may belong to the same protocol. One type of protocol may have different protocol versions. Since packet structures and/or values of fields in packets of different protocol versions may be different, in the embodiments of the present invention, as stated previously, the definition on the same protocol may be different according to different packet generating requirements. For example: the same type of protocol is regarded as the same protocol, or different protocol versions of the same type of protocol are regarded as different protocols.

If the packets in the first group of packets 101 belong to the same protocol, the result of testing the DPI device 10 may be used for measuring the performance of the DPI device 10 when performing DPI detection on the packets of the same protocol.

If the packets in the first group of packets 101 respectively belong to different protocols, the result of testing the DPI device 10 may be used for measuring the performance of the DPI device 10 when performing DPI detection on the packets of hybrid different protocols.

The packet generating device 30 and the performance analyzing device 40 included in the testing system 100 can be located in the same device and implemented as different functional modules of the same device. The functional modules can be implemented by software programming, and can also be implemented by hardware, or implemented by software running on hardware.

The testing system 100 may be implemented by one or more local servers, and may also be located at a cloud end to be provided as a service. The service may be called by a local client to implement performance testing on the DPI device 10.

Figure 2:
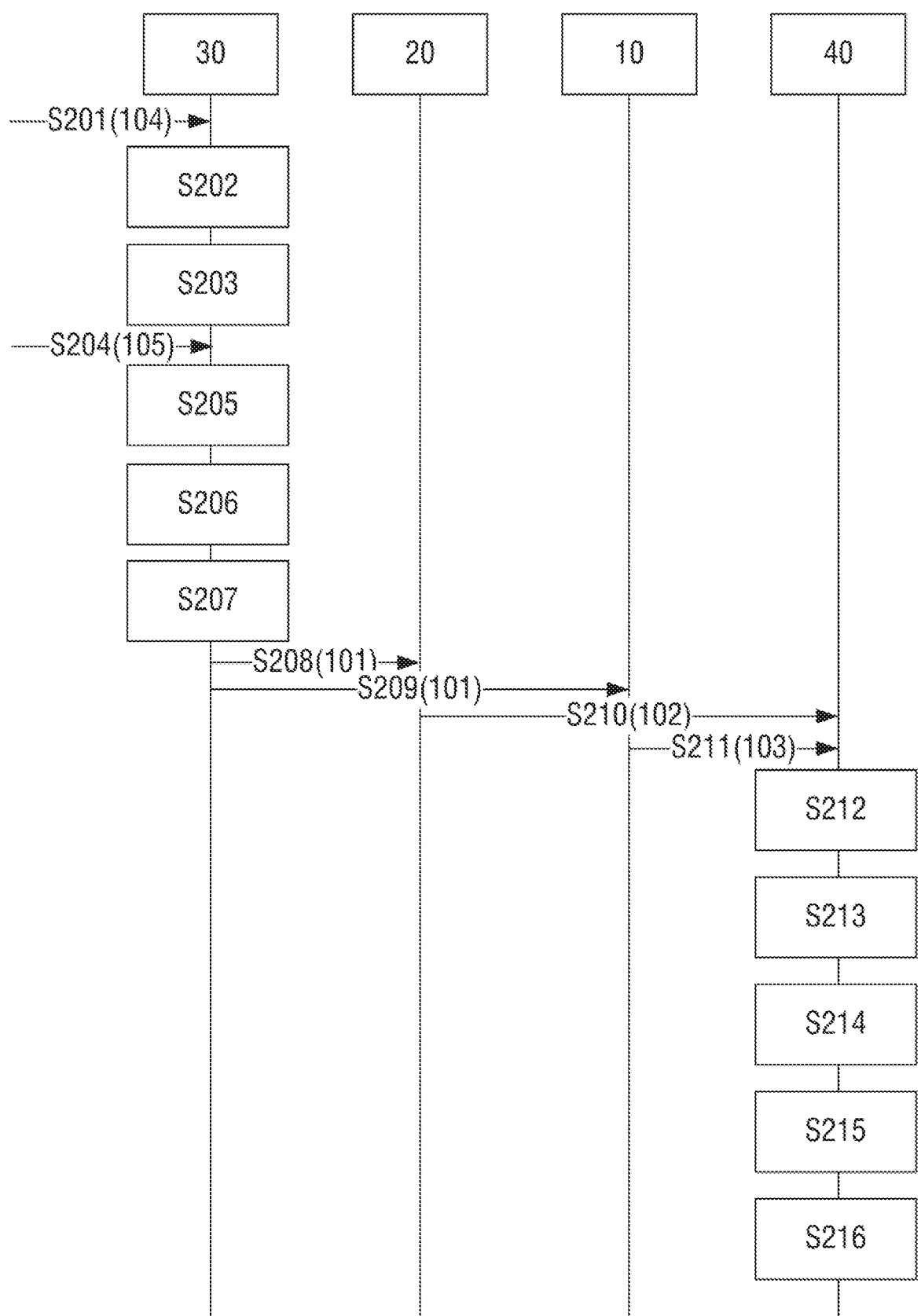
FIG. 2 is a flow chart of a testing method provided by an embodiment of the present invention.

FIG. 2 is a flow chart of a testing method provided by an embodiment of the present invention. As shown in FIG. 2, the method may comprise the following steps:

S201: a packet generating device 30 acquires a fourth group of packets 104 belonging to a first protocol. Here taking an application layer protocol as an example, the first protocol and other protocols involved by a subsequently described fifth group of packets 105 can be a hypertext transfer protocol (HTTP), file transfer protocol (FTP) or a domain name system (DNS), etc., wherein the fourth group of packets 104 acquired by the packet generating device 30 and the subsequently described fifth group of packets 105 can be packets captured from a real network. The packet structural features 106, the data value features 107 and the position relation features 108 extracted in this way can then better reflect the situation of packets in the real network.

S202: the packet generating device 30 analyzes packet structural features 106 of a PDU of the fourth group of packets 104 and data value features 107 of the same length in the same position in the PDU of each packet, and a first position relation feature 109 among packets of different message types, wherein the packet structural features 106 may comprise at least one of the features listed in Table 1. The features may be used to describe structural features of one PDU, and may also be used to describe structural features of a segment of data in one PDU. In the small table, the segment of data and the PDU are referred together as a "data block".

TABLE 1

Packet structural features 106

| Feature name | Meanings |
|---|---|
| Tag length and value (TLV) | A structure representing a data block is: firstly a tag field for indicating a type of the data block; then a length field for indicating the length of the data block; and at last a value which is a content actually transmitted by the data blocks |
| Tag and value (TV) | A structure representing a data block is: firstly a tag field for indicating a type of the data block; and then a value which is a content actually transmitted by the data block. |
| Block | A data block has a fixed tail tag |
| Fixed value (Fixed) | A data block has a fixed value |
| Set | A data block value is one of a group of values |
| Fixed length | A data block has a fixed length |
| Boundary | A data block has a boundary tag |
| Structure nesting (Sub) | A data block of one structure is nested with a data block of this structure of another structure, |

The value features 107 may comprise at least one of the features listed in Table 2. The features may be used to describe value features of data blocks of the same length in the same position in the PDU of each packet of the fourth group of packets 104.

TABLE 2

Value features 107

| Feature name | Meanings |
|---|---|
| Keyword | Data values of the same length in the same position in PDUs of at least two packets in the fourth group of packets 104 are the same |
| Character string (String) | Values are in one value range |
| Random value (Random) | Random value |
| Binary | Values are in one value range, but do not comprise visible characters |
| Meta data | Data having the same value of the same length in the same position of each packet in the fourth group of packets 104, the length exceeds a pre-set length threshold value |
| Special characters | Containing at least one pre-set special character, such as: @#! (for example: an email address may comprise a special character @, and by this feature a packet content can be deeply parsed) |
| Ascend value | Values ascend according to a packet order |
| Descend value | Values descend according to a packet order |

Here an HTTP packet is taken as an example for illustration. Generally, message types included in various HTTP packets may be different. For example: one HTTP packet comprises a GET message, which can be used to acquire a hyper text markup language (HTML) web page from a server by a client; and another HTTP packet comprises a POST message, which is used to sent information to the server from the client, for example: one client receives an HTML web page from a server via a GET message, the web page needs to input a user name and password, then the client may send a user name and password input by a user to the server via a POST message. Then, positions between different messages have certain features. In an embodiment of the present invention, the packet generating device 30 analyzes a first position relation feature 109 among packets of different message types in the fourth group of packets 104, so that a packet conforming to the first position relation 109 can be generated, and the generated packet is closer to a situation of a real network.

By extracting the above packet structural feature 106, value features 107 and/or a first position relation feature 109, the packet generating device 30 can generate a packet having at least one of the above features, which is able to effectively imitate a packet in a real network.

Before executing step S202, the packet generating device 30 may first recognize an Internet protocol (IP) header of a packet, and then recognize a transmission control protocol (TCP) or user datagram protocol (UDP) header, and next recognize a PDU, and recognize the above packet structural features 106, data block value features 107 and/or the above first position relation feature 109 of the PDU.

S203: the packet generating device 30 generates a group of first protocol packets 1011 belonging to the first protocol, wherein the PDU of the generated group of first protocol packets 1011 has the packet structural features 106, and data in the PDU of the group of first protocol packets 1011 has the value features 107, and the packets have the above first position relation feature 109.

S204: the packet generating device 30 acquires a fifth group of packets 105, wherein the fifth group of packets 105 comprises packets belonging to the first protocol and packets belonging to other protocols.

Optionally, if the first group of packets 101 comprising different protocols is to be generated, the following steps S205 to S207 may further be executed.

S205: the packet generating device 30 determines a second position relation feature 108 between the packets belonging to the first protocol and the packets belonging to other protocols in the fifth group of packets 105, wherein the fifth group of packets 105 comprises packets belonging to different protocols, The position relation features 108 may comprise at least one of the features shown in Table 3.

TABLE 3

| Second position relation features 108 | |
|---|---|
| Feature name | Meanings |
| Protocol ratio | Ratios of packets of different protocols in the fifth group of packets (105) to the quantity of packets |
| Order relationship | A sequential order relationship among packets of different protocols in the fifth group of packets (105) |

S206: the packet generating device 30 generates packets belonging to other protocols. This step S206 can be implemented similarly according to steps S201 to S203 above.

S207: according to the second position relation feature 108, the packet generating device 30 places the group of first protocol packets 1011 and the generated packets belonging to the other protocols to generate the first group of packets 101.

Optionally, before generating packets in steps S203, S206 and S207, protocol parameters 110 of the first group of packets 101 may further be set, such as: at least one of a protocol type, IP address, port number, packet transmission rate, packet length. For example: setting an IP address; for another example: setting an IP address and a port number.

S208: the packet generating device 30 sends the first group of packets 101 to a packet forwarding device 20.

S209: the packet generating device 30 sends the first group of packets 101 to a DPI device 10, wherein if as shown in FIG. 1A, the packet forwarding device 20 and the DPI device 10 are different devices, packet generating device 30 may send the first group of packets 101 to the packet forwarding device 20 and the DPI device 10 respectively.

If as shown in FIG. 1B, the packet forwarding device 20 and the DPI device 10 are the same packet processing device, whether to enable a DPI detection function can be controlled by a switch. Then the packet generating device 30 may use the aforementioned switch setting manner II to control the switch and send the first group of packets 101.

S210: the packet forwarding device 20 outputs a second group of packets 102 after forwarding the first group of packets 101.

S211: the DPI device 10 outputs a third group of packets 103 after processing the first group of packets 101.

S212: a performance analyzing device 40 receives the second group of packets 102 from the packet generating device 30, and counts packet transmission characteristics of the second group of packets 102.

S213: the performance analyzing device 40 receives the third group of packets 103 from the DPI device 10, and counts packet transmission characteristics of the third group of packets 103.

S214: the performance analyzing device 40 compares the packet transmission characteristics of the second group of packets 102 with the packet transmission characteristics of the third group of packets 103 to obtain a first performance of the DPI device 10.

Optionally, in addition to obtaining the first performance of the DPI device 10 which can be used to measure a packet processing speed when the DPI device 10 is performing DPI detection, the performance analyzing device 40 can further execute the following steps S215 to S216 to determine a second performance of the DPI device 10 which can be used to evaluate a capability of the DPI device 10 to correctly recognize packets.

S215: the performance analyzing device 40 counts the number of packets included in the third group of packets 103.

S216: the performance analyzing device 40 determines a second performance of the DPI device 10 according to the number of packets included in the third group of packets 103 and the number of packets included in the first group of packets 101.

Figure 3:
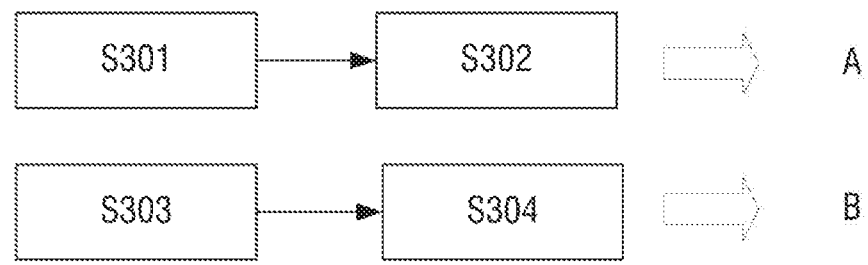
FIG. 3 is a schematic diagram of a testing process provided by an embodiment of the present invention.

FIG. 3 is a schematic diagram of a testing process provided by an embodiment of the present invention. The testing process shown in FIG. 3 may comprise two parts:

first part: single protocol testing, the testing obtains a single protocol test result A; and second part: hybrid protocol testing, the testing obtains a hybrid protocol test result B, wherein the first part of testing may comprise the following steps:

S301: base line testing.

In step S301, packets in a first group of packets 101 input by a testing system 100 to a packet forwarding device 20 belong to the same protocol, the packet forwarding device 20 outputs a second group of packets 102 after forwarding the first group of packets 101, and the testing system 100 counts packet transmission characteristics of the second group of packets 102.

S302: single protocol testing.

In step S302, the first group of packets 101 input by the testing system 100 to a DPI device 10 is the same as the packets input to the packet forwarding device 20 in step S301. The DPI device 10 outputs a third group of packets 103 after processing the first group of packets 101, and the testing system 100 counts packet transmission characteristics of the third group of packets 103.

By comparing packet transmission characteristics of the second group of packets 102 obtained in step S301 with the packet transmission characteristics of the third group of packets 103 obtained in step S302, the testing system 100 obtains a single protocol test result A, wherein the second part of testing may comprise the following steps:

S303: base line testing.

In step S303, packets in a first group of packets 101 input by a testing system 100 to a packet forwarding device 20 belong to different protocols, the packet forwarding device 20 outputs a second group of packets 102 after forwarding the first group of packets 101, and the testing system 100 counts packet transmission characteristics of the second group of packets 102.

S304: hybrid protocol testing.

In step S304, the first group of packets 101 input by the testing system 100 to a DPI device 10 is the same as the packets input to the packet forwarding device 20 in step S303. The DPI device 10 outputs a third group of packets 103 after processing the first group of packets 101, and the testing system 100 counts packet transmission characteristics of the third group of packets 103.

By comparing packet transmission characteristics of the second group of packets 102 obtained in step S303 with the packet transmission characteristics of the third group of packets 103 obtained in step S304, the testing system 100 obtains a single protocol test result B.

Furthermore, the testing system 100 may synthesize the result A and result B, and compare the performance of the DPI device 10 when processing single protocol packets and the packet transmission characteristics of the DPI device 10 when processing hybrid protocol packets. Then a reason may further be analyzed according to differences of the two performances.

Figure 4:
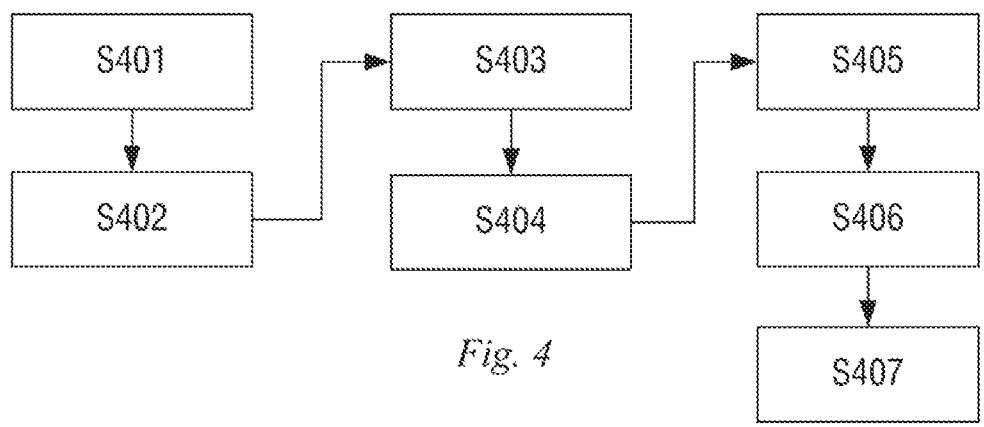
FIG. 4 is a flow chart of a packet generating method provided by an embodiment of the present invention.

FIG. 4 is a flow chart of a packet generating method provided by an embodiment of the present invention. As shown in FIG. 4, the packet generating method may comprise the following steps:

S401: acquiring a fourth group of packets 104 belonging to a first protocol;

S402: analyzing packet structural features 106 of a PDU of the fourth group of packets 104 and data value features 107 of the same length in the same position in the PDU of each packet, and a first position relation feature 109 among packets of different message types;

S403: generating a group of first protocol packets 1011 belonging to the first protocol, wherein the PDU of the generated group of first protocol packets 1011 has the packet structural features 106, and data in the PDU of the group of first protocol packets 1011 has the value features 107;

S404: acquiring a fifth group of packets 105, wherein the fifth group of packets 105 comprises packets belonging to the first protocol and packets belonging to other protocols;

S405: determining position relation features 108 between the packets belonging to the first protocol and the packets belonging to other protocols in the fifth group of packets 105;

S406: generating packets belonging to other protocols; and

S407: according to the second position relation feature 108, placing the group of first protocol packets 1011 and the generated packets belonging to the other protocols to generate the first group of packets 101.

Optionally, before steps S403, S406 and S407, protocol parameters 110 of a packet to be generated may further be set, such as: at least one of a protocol type, IP address, port number, packet transmission rate, packet length. For example: setting an IP address; for another example: setting an IP address and a port number.

Figure 5:
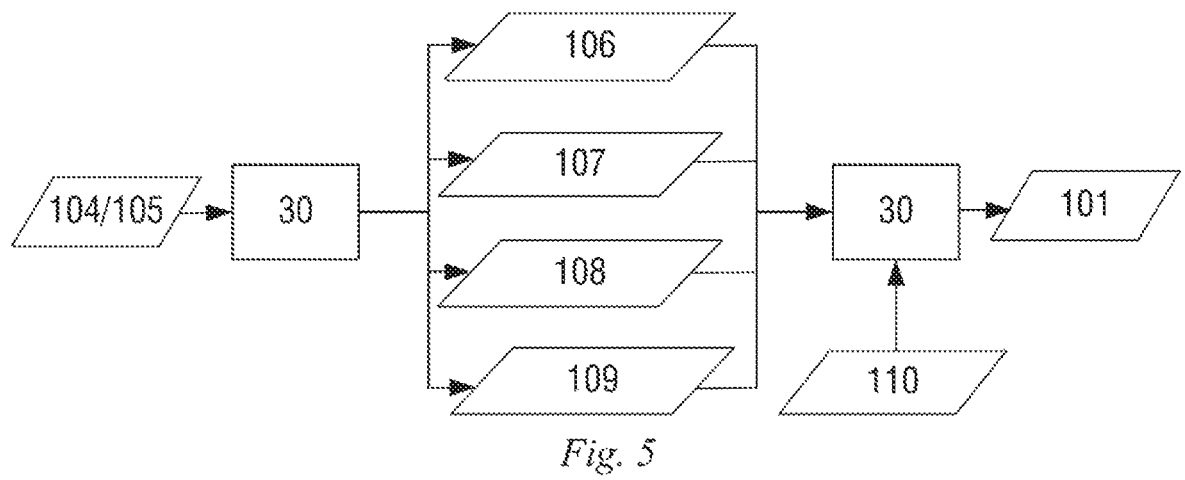
FIG. 5 is a schematic diagram of a packet generating process provided by an embodiment of the present invention.

FIG. 5 is a schematic diagram of a packet generating process provided by an embodiment of the present invention. As shown in FIG. 5, sampling packets such as a fourth group of packets 104 and a fifth group of packets 105, etc. are input in a packet generating device 30, and the packet generating device 30 analyzes same to obtain packet structural features 106 in a PDU of the sampling packets and data value features 107 in the PDU. Optionally, if the sampling packets comprise packets of different protocols, the packet generating device 30 may further analyze same to obtain position relation features 108 among packets of different protocols. According to these features, optionally, protocol parameters 110 to generate a first group of packets 101 may further be configured to finally generate the first group of packets 101.

Figure 6:
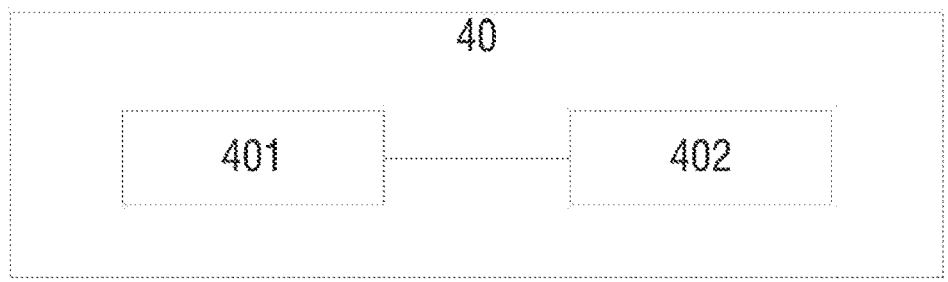
FIG. 6 is a schematic structural diagram of a first performance analyzing device provided by an embodiment of the present invention.

FIG. 6 is a schematic structural diagram of a first performance analyzing device 40 provided by an embodiment of the present invention. As shown in FIG. 6, the performance analyzing device 40 may comprise:

a packet acquiring module 401, configured to receive a second group of packets 102 from a packet forwarding device 20, the second group of packets 102 being output after the packet forwarding device 20 forwards a first group of packets 101, and the packet forwarding device 20 performing no DPI detection on the first group of packets 101;

a performance counting module 402, configured to count packet transmission characteristics of the second group of packets 102;

the packet acquiring module 401 being further configured to receive a third group of packets 103 from the DPI device 10, the third group of packets 103 being output after the DPI device 10 processes the first group of packets 101;

the performance counting module 402 being further configured to count packet transmission characteristics of the third group of packets 103; and the performance counting module 402 being further configured to compare the packet transmission characteristics of the second group of packets 102 with the packet transmission characteristics of the third group of packets 103 to obtain a first performance of the DPI device 10.

Optionally, the performance counting module 402 is further configured to, after the packet acquiring module 401 receives the third group of packets 103, count the number of packets included in the third group of packets 103; and determine a second performance of the DPI device 10 according to the number of packets included in the third group of packets 103 and the number of packets included in the first group of packets 101.

Other optional implementations of the performance analyzing device 40 may refer to the implementation of the performance analyzing device 40 in various embodiments above, which will not be described herein.

Figure 7:
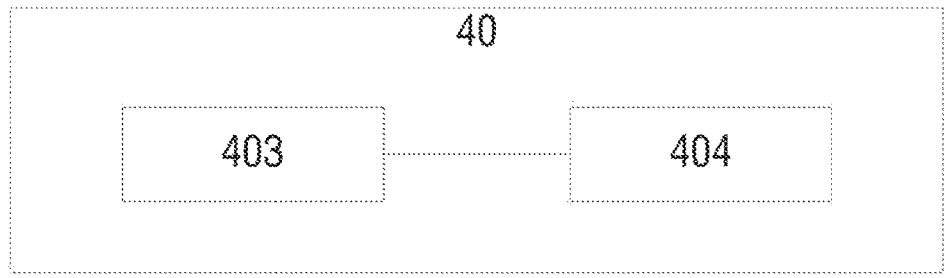
FIG. 7 is a schematic structural diagram of a second performance analyzing device provided by an embodiment of the present invention.

FIG. 7 is a schematic structural diagram of a second performance analyzing device 40 provided by an embodiment of the present invention. As shown in FIG. 7, the second performance analyzing device 40 comprises:

at least one memory 403, configured to store machine-readable instructions; and at least one processor 404, configured to call the machine-readable instructions to execute a testing method provided by the embodiments of the present invention.

The second performance analyzing device 40 shown in FIG. 7 can be regarded as a specific implementation of the first performance analyzing device 40 shown in FIG. 6, wherein the packet acquiring module 401 and the performance counting module 402 can be program modules and stored in the memory 403 as machine-readable instructions, and the processor 404 calls these program modules to implement the functions of these program modules.

Figure 8:
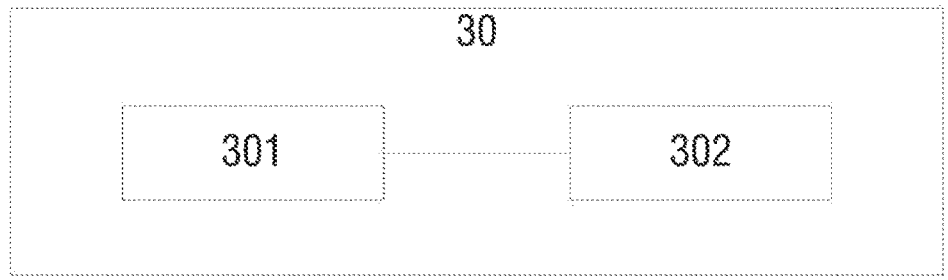
FIG. 8 is a schematic structural diagram of a first packet generating device provided by an embodiment of the present invention.

FIG. 8 is a schematic structural diagram of a first packet generating device 30 provided by an embodiment of the present invention. As shown in FIG. 8, the first packet generating device 30 may comprise:

a packet acquiring module 301, configured to acquire a fourth group of packets 104 belonging to the first protocol;

a packet generating module 302, configured to:

analyze packet structural features 106 of a protocol data unit (PDU) of the fourth group of packets 104 and value features 107 of data blocks of the same length in the same position in the PDU of each packet, and generate a group of first protocol packets 1011 belonging to the first protocol, wherein the generated group of first protocol packets 1011 has the packet structural features 106, and data of the group of first protocol packets 1011 has the value features 107.

Optionally, the packet generating module 302 is further configured to, after the packet acquiring module 301 acquires the fourth group of packets 104 belonging to the first protocol, analyze a first position relation feature 109 among the packets containing messages of different message types in the fourth group of packets 104; and when the group of first protocol packets 1011 is generated, the packet generating module 302 is specifically configured to: generate the group of first protocol packets 1011 according to the first position relation feature 109.

Optionally, the packet acquiring module 301 is further configured to acquire a fifth group of packets 105 when the packets in the first group of packets 101 respectively belong to different protocols, wherein the fifth group of packets 105 comprises packets belonging to the first protocol and packets belonging to other protocols; and the packet generating module 302 is further configured to: determine a second position relation feature 108 between the packets belonging to the first protocol and the packets belonging to other protocols in the fifth group of packets 105; generate the packets belonging to the other protocols; and, after generating the group of first protocol packets 1011 and the packets belonging to the other protocols, according to the second position relation feature 108, place the group of first protocol packets 1011 and the generated packets belonging to the other protocols to generate the first group of packets 101.

Optionally, the packet generating module 302 is further configured to: before generating the first group of packets 101, set protocol parameters 110 of the first group of packets 101; and when the first group of packets 101 is generated, the packet generating module 302 is specifically configured to: generate the first group of packets 101 according to the protocol parameters 110.

Other optional implementations of the packet generating device 30 may refer to the implementation of the packet generating device 30 in various embodiments above, which will not be described herein.

Figure 9:
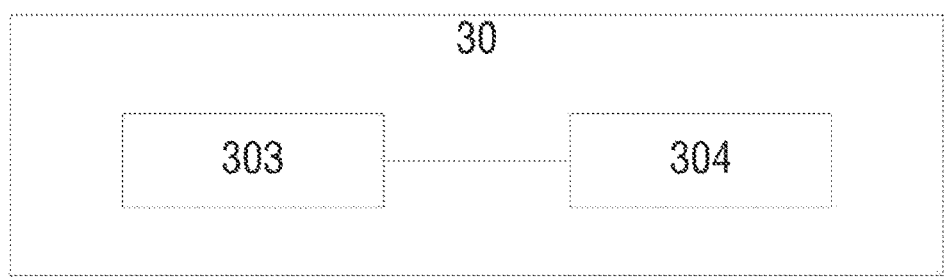
FIG. 9 is a schematic structural diagram of a second performance analyzing device provided by an embodiment of the present invention.

FIG. 9 is a schematic structural diagram of a second packet generating device 30 provided by an embodiment of the present invention. As shown in FIG. 9, the second packet generating device 30 may comprise:

at least one memory 303, configured to store machine-readable instructions; and at least one processor 304, configured to call the machine-readable instructions to execute a packet generating method provided by the embodiments of the present invention.

The second packet generating device 30 shown in FIG. 9 can be regarded as a specific implementation of the first packet generating device 30 shown in FIG. 8, wherein one packet acquiring module 301 and a packet generating module 302 can be program modules and stored in the memory 303 as machine-readable instructions, and the processor 304 calls these program modules to implement the functions of these program modules.

The embodiments of the present invention further provide a machine-readable medium, wherein the machine-readable medium stores machine-readable instructions thereon that when executed by a processor cause the processor to execute a packet generating method and/or testing method provided by the embodiments of the present invention.

The embodiments of the present invention further provide a machine-readable instruction that when executed by a processor causes the processor to execute a packet generating method and/or testing method provided by the embodiments of the present invention.

The machine-readable medium provided by the embodiments of the present invention stores machine-readable instructions thereon that when executed by a processor cause the processor to execute any of the foregoing methods. Specifically, a system or apparatus equipped with a machine-readable medium may be provided, and the machine-readable medium stores thereon software program codes that implement the functions of any one of the embodiments described above, and cause a computer or processor of the system or apparatus to read and execute machine-readable instructions stored in the machine-readable medium.

In this condition, the program codes per se read from the machine-readable medium may implement the functions of any one of the embodiments described above, and therefore the machine-readable codes and the machine-readable medium storing the machine-readable codes constitute a part of the present invention.

The embodiments of the machine-readable medium comprise a floppy disk, a hard disk, a magnetic optical disc, an optical disc (such as CD-ROM, CD-R, CD-RW, DVD-ROM, DVD-RAM, DVD-RW and DVD+RW), a magnetic tape, a non-volatile memory card and ROM. Optionally, the program codes may be downloaded from a server computer or a cloud via a communication network.

It needs to be noted that not all the steps and modules in the flows and structural diagrams of the system described above are necessary, and some steps or modules may be omitted according to practical requirements. The execution order of the various steps is not fixed and may be adjusted according to requirements. The system structure described in the various embodiments above may be a physical structure and may also be a logical structure, i.e. some modules may be implemented by the same physical entity, or some modules may be implemented separately by a plurality of physical entities, or may be implemented together by some components in a plurality of independent devices.

In the various embodiments above, a hardware unit may be implemented mechanically or electrically. For example, a hardware unit may comprise a permanent dedicated circuit or logic (such as a dedicated processor, FPGA or ASIC) to accomplish a corresponding operation. The hardware unit may also comprise a programmable logic or circuit (such as a general-purpose processor or other programmable processors), and may be set temporarily by hardware to accomplish a corresponding operation. The specific implementation method (mechanically, or a dedicated permanent circuit, or a temporarily set circuit) may be determined in consideration of cost and time.

The present invention is illustrated and described in detail above by way of drawings and preferred embodiments; however, the present invention is not limited to these disclosed embodiments. Based on the plurality of embodiments described above, those skilled in the art would know that code checking devices in different embodiments above may be combined to obtain more embodiments of the present invention, and these embodiments also fall within the scope of protection of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A testing method, usable to test performance of a deep packet inspection (DPI) device, the testing method comprising:

receiving a second group of packets from a packet forwarding device, the second group of packets being output after the packet forwarding device forwards a first group of packets, and the packet forwarding device performing no DPI detection on the first group of packets;

counting packet transmission characteristics of the second group of packets;

receiving a third group of packets from the DPI device, the third group of packets being output after the DPI device processes the first group of packets;

counting packet transmission characteristics of the third group of packets; and comparing the packet transmission characteristics of the second group of packets with the packet transmission characteristics of the third group of packets to obtain a first performance of the DPI device; and generating a group of first protocol packets belonging to a first protocol in the first group of packets, the generating including:

acquiring a fourth group of packets belonging to the first protocol, analyzing packet structural features of a protocol data unit (PDU) of the fourth group of packets and value features of data blocks of a same length in a respectively same position in a PDU of each respective packet, and generating the group of first protocol packets, wherein a PDU of the group of first protocol packets generated includes the packet structural features, and data in the PDU of the group of first protocol packets generated includes the value features, wherein, after the acquiring of the fourth group of packets belonging to the first protocol, the testing method further comprises:

analyzing a first position relation feature among the packets containing messages of different message types in the fourth group of packets; and generating the group of first protocol packets according to the first position relation feature.

2. The testing method of claim 1, wherein the packet transmission characteristics include at least one of:

a packet transmission rate;

a packet transmission delay; and a packet transmission jitter.

3. The testing method of claim 1, wherein, after receiving the third group of packets, the testing method further comprises:

comparing the first group of packets with the third group of packets to determine a second performance of the DPI device.

4. The testing method of claim 1, wherein either:

the packets in the first group of packets respectively belong to different protocols, or the packets in the first group of packets belong to a same protocol.

5. The testing method of claim 1, wherein packets in the first group of packets belong to different protocols, and the testing method further comprises:

acquiring a fifth group of packets, wherein the fifth group of packets includes packets belonging to the first protocol and packets belonging to other protocols;

determining a second position relation feature between the packets in the fifth group of packets belonging to the first protocol and the packets in the fifth group of packets belonging to other protocols;

generating the packets in the fifth group of packets belonging to the other protocols; and after generating the group of first protocol packets and the packets in the fifth group of packets belonging to the other protocols, according to the second position relation feature, placing the group of first protocol packets and the packets in the fifth group of packets generated, belonging to the other protocols, to generate the first group of packets.

6. A performance analyzing device, comprising:
at least one memory, configured to store machine-readable instructions; and
at least one processor, configured to call the machine-readable instructions to execute the following so as to test performance of a deep packet inspection (DPI) device:
  receiving a second group of packets from a packet forwarding device, the second group of packets being output after the packet forwarding device forwards a first group of packets, and the packet forwarding device performing no DPI detection on the first group of packets;
  counting packet transmission characteristics of the second group of packets;
  receiving a third group of packets from the DPI device, the third group of packets being output after the DPI device processes the first group of packets;
  counting packet transmission characteristics of the third group of packets;
  comparing the packet transmission characteristics of the second group of packets with the packet transmission characteristics of the third group of packets to obtain a first performance of the DPI device; and
  generating a group of first protocol packets belonging to a first protocol in the first group of packets as follows:
    acquiring a fourth group of packets belonging to the first protocol;
    analyzing packet structural features of a protocol data unit (PDU) of the fourth group of packets and value features of data blocks of a same length in a respectively same position in a PDU of each respective packet; and
    generating the group of first protocol packets, wherein a PDU of the group of first protocol packets generated includes the packet structural features, and data in the PDU of the group of first protocol packets generated includes the value features,
wherein the at least one processor is further configured to:
after the acquiring of the fourth group of packets belonging to the first protocol,
  analyze a first position relation feature among the packets containing messages of different message types in the fourth group of packets; and
  generate the group of first protocol packets according to the first position relation feature.

7. The device of claim 6, wherein the packet transmission characteristics include at least one of:
a packet transmission rate;
a packet transmission delay; and
a packet transmission jitter.

8. The device of claim 6, wherein either:
the packets in the first group of packets respectively belong to different protocols, or
the packets in the first group of packets belong to a same protocol.

9. The device of claim 6, wherein the packets in the first group of packets respectively belong to different protocols, and the at least one processor is further configured to:
  acquire a fifth group of packets, wherein the fifth group of packets includes packets belonging to the first protocol and packets belonging to other protocols;
  determine a second position relation feature between the packets in the fifth group of packets belonging to the first protocol and the packets in the fifth group of packets belonging to other protocols;
  generate the packets in the fifth group of packets belonging to the other protocols; and
  after generating the group of first protocol packets and the packets in the fifth group of packets belonging to the other protocols, according to the second position relation feature, place the group of first protocol packets and the packets in the fifth group of packets generated, belonging to the other protocols, to generate the first group of packets.

10. A non-transitory machine-readable medium, storing machine-readable instructions thereon that when executed by a processor, cause the processor to execute the following to test performance of a deep packet inspection (DPI) device:
  receiving a second group of packets from a packet forwarding device, the second group of packets being output after the packet forwarding device forwards a first group of packets, and the packet forwarding device performing no DPI detection on the first group of packets;
  counting packet transmission characteristics of the second group of packets;
  receiving a third group of packets from the DPI device, the third group of packets being output after the DPI device processes the first group of packets;
  counting packet transmission characteristics of the third group of packets; and
  comparing the packet transmission characteristics of the second group of packets with the packet transmission characteristics of the third group of packets to obtain a first performance of the DPI device; and
  generating a group of first protocol packets belonging to a first protocol in the first group of packets as follows:
    acquiring a fourth group of packets belonging to the first protocol;
    analyzing packet structural features of a protocol data unit (PDU) of the fourth group of packets and value features of data blocks of a same length in a respectively same position in a PDU of each respective packet; and
    generating the group of first protocol packets, wherein a PDU of the group of first protocol packets generated includes the packet structural features, and data in the PDU of the group of first protocol packets generated includes the value features,
wherein the machine-readable instructions, when executed, cause the processor to further execute, after acquiring the fourth group of packets belonging to the first protocol,
  analyzing a first position relation feature among the packets containing messages of different message types in the fourth group of packets; and
  generating the group of first protocol packets according to the first position relation feature.

11. The non-transitory machine-readable medium of claim 10, wherein, after receiving the third group of packets, the machine-readable instructions, when executed, cause the processor to further execute:

comparing the first group of packets with the third group of packets to determine a second performance of the DPI device.

12. The non-transitory machine-readable medium, of claim 10, wherein the packets in the first group of packets respectively belong to different protocols, and wherein the machine-readable instructions, when executed, cause the processor to further execute:
  acquiring a fifth group of packets, wherein the fifth group of packets includes packets belonging to the first protocol and packets belonging to other protocols;
  determining a second position relation feature between the packets in the fifth group of packets belonging to the first protocol and the packets in the fifth group of packets belonging to other protocols;
  generating the packets in the fifth group of packets belonging to the other protocols; and
  after generating the group of first protocol packets and the packets belonging to the other protocols, according to the second position relation feature, placing the group of first protocol packets and the packets in the fifth group of packets generated, belonging to the other protocols, to generate the first group of packets.

* * * * *